United States Patent
Pohr

[15] 3,704,981
[45] Dec. 5, 1972

[54] FLY GUN

[72] Inventor: Jack Pohr, 12 Garden Drive, El Paso County, Colo. 80904

[22] Filed: Dec. 31, 1970

[21] Appl. No.: 103,057

[52] U.S. Cl. ............................................. 43/135, 124/18
[51] Int. Cl. ............................................................ A01m 3/00
[58] Field of Search ................ 43/135; 124/17, 18, 35

[56] References Cited

UNITED STATES PATENTS

| 1,597,140 | 8/1926 | Barto | 43/135 |
| 1,059,736 | 4/1913 | Kilduff | 124/18 |
| 1,084,008 | 1/1914 | Hamaker | 124/18 |
| 3,308,571 | 3/1967 | Jones | 43/135 |
| 3,536,055 | 10/1970 | Endo | 124/18 |

*Primary Examiner*—Warner H. Camp
*Attorney*—Richard W. Hanes

[57] ABSTRACT

A pistol shaped insect gun having an elongated barrel and a depending handle attached to one end thereof and with an elastic member attached to the other end of the barrel and having means on the handle for releasably securing the free end of the elastic member when the said member is in a stretched condition.

2 Claims, 5 Drawing Figures

PATENTED DEC 5 1972 3,704,981
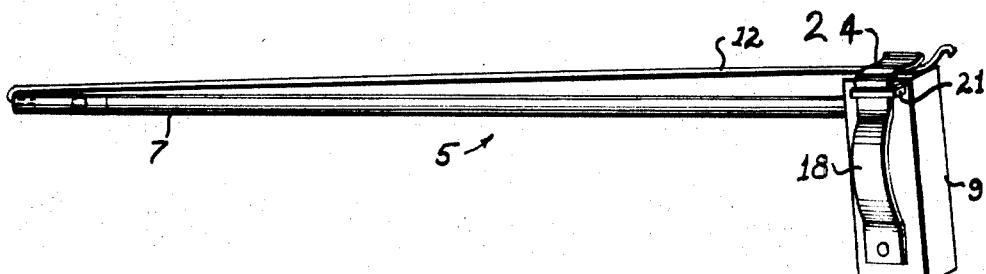
Fig. 1
 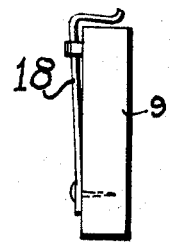 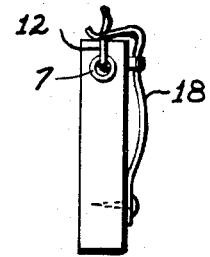
Fig. 2  Fig. 3  Fig. 4
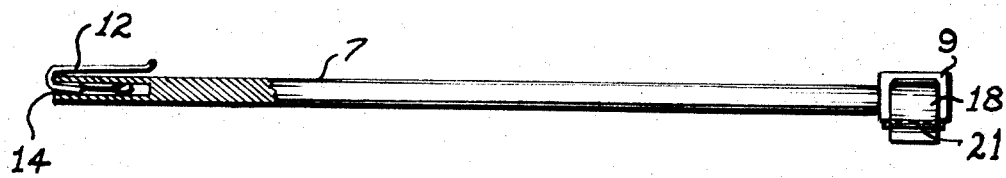
Fig. 5
INVENTOR.
JACK POHR
BY Richard W Hanes
ATTORNEY

FLY GUN

This invention relates to a novel insect destroying apparatus and its chief object is to provide a device for killing flies and other insects which is simple and cheaply made, effective in its use, and will afford some amusement in its operation.

Other objects of the invention will become apparent as hereinafter more fully described and particularly pointed out in the claims, reference being had to the accompanying drawings in which:

FIG. 1 is a perspective view of the fly gun of the present invention showing the elastic firing band in stretched and retained position ready for firing.

FIG. 2 is a rear end view of the fly gun showing the trigger band in its position for retaining the stretched elastic band.

FIG. 3 is a rear end view of the fly gun showing the trigger band in its squeezed or release position.

FIG. 4 is a front end view of the fly gun showing a position similar to that of FIG. 2.

FIG. 5 is a top plan view of the fly gun with a portion of the barrel broken away and shown in cross section to illustrate one embodiment of the elastic band fastening means.

The fly gun is referred to generally by reference numeral 5 and comprises a tubular barrel 7 which is secured to a handle 9.

The elastic member 12 which acts as the destructive force for the gun may be secured into the barrel 7 by a number of means, however, a preferred form of attachment consists of securing the one end of the elastic member 12 inside a tubular compressible plug 14, such as one made of lead, and inserting the plug into the tubular barrell 7 where it will be maintained by a squeeze fit.

An alternative method of fastening the band 12 consists of running the end to be secured through the entire length of the barrel and fastening the end at the handle by any convenient means.

In order to activate and fire the gun, a springable trigger band 18 is provided and is attached to the side of the handle 9. The trigger band is constructed of a pre-bent springable material which protrudes outwardly along its mid-position and is held close to the top of the handle 9 by a bracket 21. The action of the bracket is to provide a fulcrum so that when the mid-portion of the trigger band 18 is squeezed by the hand of the operator the top retainer portion 24 is lifted away from the handle, releasing the free end of the elastic band. The quick release of the stored energy in the stretched elastic band results in a well known and experienced snapping action of the elastic band and quick destruction to an insect which may be within range.

I claim:

1. An insect destruction appliance comprising:
   an elongated barrel;
   a pistol grip handle attached to one end of the barrel;
   an elastic band secured to the barrel;
   firing and retaining means attached to the handle and adapted to retain the free end of the elastic band, comprising:
   an L-shaped springable band secured to the side of the handle and further including a fulcrum bracket, wherein one leg of the L-shaped band is disposed over the top of the handle so as to normally hold the end of the elastic band against the top of the handle.

2. An insect destruction appliance comprising:
   an elongated barrel;
   a pistol grip handle attached to one end of the barrel;
   an elastic band secured to the barrel;
   firing and retaining means attached to the handle and adapted to retain the free end of the elastic band, comprising:
   an L-shaped springable band secured to the side of the handle and further including a fulcrum bracket, wherein one leg of the L-shaped band is disposed over the top of the handle so as to normally hold the end of the elastic band against the top of the handle, and
   wherein the barrel is tubular and one end of the elastic band is secured within the tubular barrel.

* * * * *